(12) United States Patent
Torres et al.

(10) Patent No.: US 10,264,509 B2
(45) Date of Patent: Apr. 16, 2019

(54) MOBILE NETWORK NODE ROUTING

(71) Applicant: Hughes Network Systems, LLC, Germantown, MD (US)

(72) Inventors: Robert Torres, New Market, MD (US); George Joseph Choquette, Potomac, MD (US); Trevor Alan Eagling, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 110 days.

(21) Appl. No.: 15/281,042

(22) Filed: Sep. 29, 2016

(65) Prior Publication Data

US 2018/0092020 A1 Mar. 29, 2018

(51) Int. Cl.

| H04B 7/185 | (2006.01) |
|---|---|
| H04W 40/20 | (2009.01) |
| H04L 12/755 | (2013.01) |
| H04W 40/24 | (2009.01) |
| H04W 4/029 | (2018.01) |
| H04W 88/16 | (2009.01) |
| H04W 40/18 | (2009.01) |

(52) U.S. Cl.
CPC .......... *H04W 40/20* (2013.01); *H04B 7/1851* (2013.01); *H04B 7/18521* (2013.01); *H04B 7/18584* (2013.01); *H04L 45/021* (2013.01); *H04W 4/029* (2018.02); *H04W 40/248* (2013.01); *H04B 7/18519* (2013.01); *H04W 40/18* (2013.01); *H04W 40/24* (2013.01); *H04W 88/16* (2013.01)

(58) Field of Classification Search
None
See application file for complete search history.

(56) References Cited

U.S. PATENT DOCUMENTS

| 5,430,729 | A | 7/1995 | Rahnema | |
|---|---|---|---|---|
| 6,567,645 | B1 * | 5/2003 | Wiedeman | H04B 7/18534 455/12.1 |
| 6,775,251 | B1 * | 8/2004 | Wiedeman | H04B 7/18558 370/316 |
| 8,665,777 | B2 * | 3/2014 | Marshack | H04B 7/18521 370/261 |
| 2008/0015774 | A1 * | 1/2008 | Donatelli | G01C 21/28 701/118 |
| 2009/0054043 | A1 * | 2/2009 | Hamilton | G01S 5/0284 455/414.2 |

(Continued)

FOREIGN PATENT DOCUMENTS

EP 0652649 A2 5/1995

OTHER PUBLICATIONS

International Search Report and Written Opinion of International Searching Authority in PCT/US2017/053505 dated Dec. 1, 2017 (13 pages).

*Primary Examiner* — Phirin Sam
(74) *Attorney, Agent, or Firm* — Bejin Bieneman PLC

(57) ABSTRACT

A telecommunication system includes a resource manager programmed to determine a future location of a first mobile node and a future location of a second mobile node. The resource manager updates a routing table with the future location of the first mobile node and the future location of the second mobile node and transmits the routing table for upload to the first mobile node and the second mobile node.

18 Claims, 5 Drawing Sheets

(56) References Cited

U.S. PATENT DOCUMENTS

| | | | |
|---|---|---|---|
| 2010/0309828 A1* | 12/2010 | Nguyen | H04B 7/18539 370/281 |
| 2011/0126060 A1* | 5/2011 | Grube | G06F 17/30194 714/48 |
| 2014/0324615 A1* | 10/2014 | Kulkarni | H04W 4/70 705/26.1 |
| 2014/0324931 A1* | 10/2014 | Grube | G06F 11/1092 707/828 |
| 2014/0325224 A1* | 10/2014 | Grube | G06F 17/30194 713/168 |
| 2016/0174016 A1* | 6/2016 | Moon | H04W 40/244 370/329 |
| 2016/0224951 A1* | 8/2016 | Hoffberg | G06Q 20/401 |
| 2016/0337799 A1* | 11/2016 | Johnson | H04W 4/02 |
| 2017/0032586 A1* | 2/2017 | Cheatham, III | G07C 5/008 |
| 2017/0032587 A1* | 2/2017 | Cheatham, III | G07C 5/008 |
| 2017/0256097 A1* | 9/2017 | Finn | G06T 7/73 |
| 2017/0295461 A1* | 10/2017 | Smith | H04W 4/029 |
| 2017/0300049 A1* | 10/2017 | Seally | G06Q 10/00 |
| 2018/0035419 A1* | 2/2018 | Beattie, Jr. | H04W 72/048 |
| 2018/0049043 A1* | 2/2018 | Hoffberg | G06Q 10/0631 |
| 2018/0232787 A1* | 8/2018 | Dupray | G06Q 30/02 |

* cited by examiner

| Beam | Output Port |
|---|---|
| 1 | ISL A |
| 2 | ISL B |
| ... | |
| 142 | Downlink X |
| 143 | Downlink Y |
| ... | |
| 1000 | ISL A |

FIGURE 3

| Tag 1 | Tag 2 | Beam | Output Port |
|---|---|---|---|
| 100 | N/A | N/A | ISL A |
| 200 | N/A | N/A | ISL B |
| 300 | 100 | N/A | ISL A |
| 300 | 200 | N/A | ISL C |
| 300 | 300 | 1 | Downlink Y |
| 300 | 300 | 2 | Downlink Y |
| 300 | 300 | 3 | Downlink Z |
| ... | | | |

FIGURE 4

| Beam | Priority | Output Port | Alternate Output Port |
|---|---|---|---|
| 1 | H | ISL A | ISL B |
| | M | ISL A | ISL B |
| | L | ISL A | Drop |
| 2 | H | ISL B | ISL A |
| | M | ISL A | ISL B |
| | L | ISL C | ISL A |
| ... | | | |
| 142 | H | Downlink Y | ISL D |
| | M | Downlink Y | ISL D |
| | L | Downlink Y | Drop |
| ... | | | |

FIGURE 5

| Beam | Output Port |
|---|---|
| 1 | Satellite A Uplink |
| 2 | Satellite A Uplink |
| ... | |
| 142 | Satellite A Uplink |
| 143 | Satellite B Uplink |
| ... | |
| 1000 | Satellite B Uplink |

FIGURE 6

MOBILE NETWORK NODE ROUTING

BACKGROUND

Various communication protocols define how to route signals from one network node to the next. For instance, a routing protocol defines how routers communicate with one another. Routing tables provide a virtual "map" of certain sections of a network. That is, the routers can use the routing table to determine where to forward a message so that it is most likely to reach its destination.

BRIEF DESCRIPTION OF THE DRAWINGS

FIG. 3 illustrates an example per beam routing table.

FIG. 4 illustrates an example hierarchical routing table.

FIG. 5 illustrates an example per beam routing table and alternate path information.

FIG. 6 illustrates an example routing table at a gateway node.

DETAILED DESCRIPTION

Figure 1:
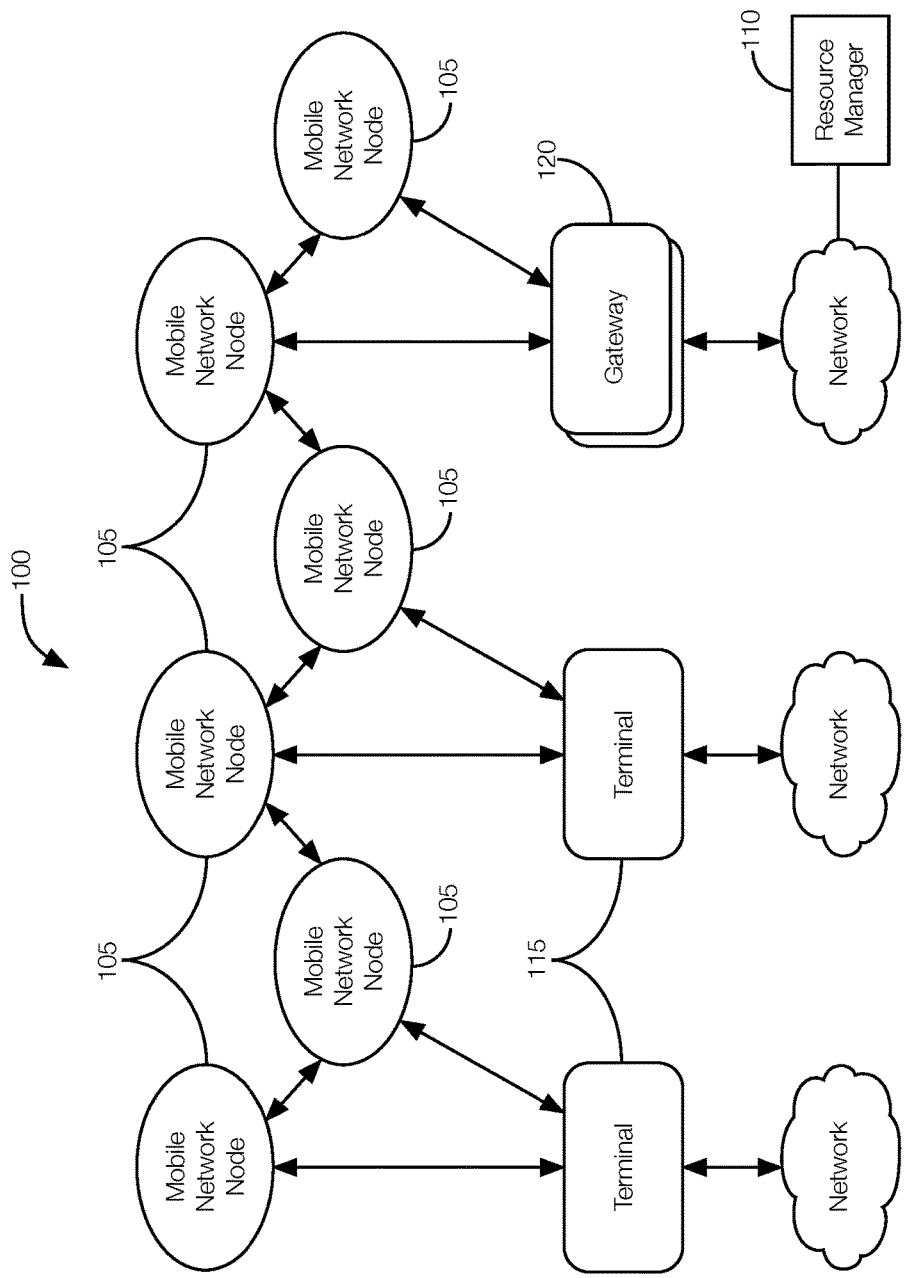
FIG. 1 illustrates an example network with mobile network nodes and a resource manager.

Routing protocols often assume slowly changing network configurations. For instance, routing protocols assume that the communications are transmitted among terrestrial-based routers that are generally at a fixed physical location. To the extent network changes are made (e.g., routers are moved, added, or removed), the routing tables are updated to reflect the change in the network.

Routing protocols often assume unchanging (or infrequently changing) network nodes. Thus, routing protocols are not designed to handle constantly moving network nodes. For instance, future low earth orbiting satellite systems (and possibly other non-GEO systems, such as elliptical orbit systems) include a number of network nodes (satellites) with potentially dynamic, if predictable, connections to both neighbor satellite nodes, but also to ground nodes. A class of these systems have Inter-Satellite Links (ISLs) that temporarily connect two satellites in the constellation in the same or different plane or orbit.

Such a network has the following characteristics which are different than traditional routing and switching networks. First, a ground network is reachable from one or more satellite network nodes at any moment in time, but only for a limited time (i.e., based on the location of the satellite relative to the ground network node). Second, a satellite network node is moving relative to the ground and the ground networks that it can reach change with time. Third, a satellite network node is moving relative to other satellite network nodes in its planes and in other planes. It may be able to directly connect with one or more of those other satellite network nodes at any moment, but potentially only for a limited time. Satellite network nodes in the same plane may be neighbors for a longer time or permanently while satellite network nodes in different planes can only be neighbors transiently.

Such a satellite network system can move packets from one location on earth (from a user terminal or gateway) to another location on earth (to another user terminal or gateway) so long as it can determine how packets reach their destination. Some or all of the following criteria could potentially be taken into account to successfully route/switch packets to the destination: latency, uplink congestion (from a terminal/gateway to a satellite network node), ISL congestion (from a satellite network node to another satellite network node), downlink congestion (from a satellite network node to a terminal/gateway), priority of the packet, drop eligibility of the packet, current network topology identifying which ground locations are reachable from which satellite network nodes and which satellite network nodes are neighbors (via ISL) at time T, and frequency and/or interference constraints in certain geographic regions.

While the term routing is often specifically used for layer 3 routing to an IP subnet, it may more generically refer to deciding which output port to send a packet that arrived on an input port based on a set of criteria including destination information in the packet header and the current route table at the network node that is making the decision. The functions may be assumed to apply at Layer 2 and on Layer 2 addressing, but do not contain the expected functions associated with a switch (including interface learning, broadcast flooding, etc.).

Potential solutions that could be applied to the problem that impacts how each network node learns its current route table include a dynamic routing option, a static routing option, or a hybrid option. The dynamic option may involve the constant passing of state information amongst neighboring network nodes to assist network nodes in building local routing tables based on the information learned from the state information. Since some neighbor information may be predictable (e.g., at a certain position in orbit, my likely neighbors are A, B and C), it may be possible to simplify the changing neighbor aspect of the state exchange. The static option may rely on a ground system (referred to below as a resource manager) to calculate current and future network topologies, upload those current and future time-based tables to the satellite network nodes, and have the satellite network node implement the current table as a function of its time tick. With the exception of reacting to specific failures and given a predictable orbit and predictable time table for connecting ISLs, this table could be calculated far in advance as long as it can be stored in the satellite network nodes. The hybrid option may be implemented via static time-based route tables sent to the satellite by a ground system but have nodes exchange dynamic information on failures of neighbor links (including uplink and downlink) that allow a pre-defined alternate path to be taken.

One example telecommunication system that routes network traffic among mobile nodes includes a resource manager programmed to determine a future location of a first mobile node and a future location of a second mobile node. The resource manager updates a routing table with the future location of the first mobile node and the future location of the second mobile node and transmits the routing table for upload to the first mobile node and the second mobile node.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, a telecommunication system 100 includes mobile nodes 105, a resource manager 110, terminals 115, and gateways 120.

The mobile nodes 105 are computing devices that collectively form a constellation (i.e., a group) of network nodes whose position changes relative to one another, to the ground, or both. The mobile nodes 105 are implemented via circuits, chips, or other electronic components and may each be located on a satellite, truck or other automobile, airplane, helicopter, shipping vessel, boat, etc. In the context of a satellite, the mobile nodes 105 may be in low Earth orbit (LEO) in multiple planes and orbits relative to one another. Examples of orbits may include a polar orbit or an inclined orbit. Because the mobile nodes 105 are moving relative to the ground, the downlink and uplink beams served by each respective mobile node 105 changes over time. Moreover, because the mobile nodes 105 can move relative to one another, neighboring mobile nodes 105 may also change over time. Thus, the other mobile nodes 105 available for direct communication may change as one or more of the mobile nodes 105 moves.

The resource manager 110 is implemented via one or more computing devices (e.g., distributed computing), each having circuits, chips, or other electronic components that collectively monitor the position and location of multiple mobile nodes 105, as well as the connectivity needs of each of the mobile nodes 105 monitored. The resource manager 110 is programmed to develop a communication strategy for the various locations of the mobile nodes 105 at particular times in the future (referred to as "time ticks"). Developing the communication strategy may include the processor developing one or more routing tables. For instance, the processor may be programmed to develop a routing table for each time tick based on where each mobile node 105 is expected to be at that time tick. Alternatively, the resource manager 110 may be programmed to develop a single routing table that considers the future locations of multiple mobile nodes 105 at multiple time ticks.

Thus, in developing the routing tables, the resource manager 110 may be programmed to determine the future locations of multiple mobile nodes 105 relative to future time ticks, determine which of the mobile nodes 105 will be able to communicate with one another or various ground stations at each time tick (e.g., associate each future location to a time tick), and generate or update the routing table according to the future locations and connectivity at each time tick. In one possible approach, the resource manager 110 may be programmed to determine the future locations of the mobile nodes 105 according to the movement pattern of the mobile node 105. For instance, if the mobile nodes 105 are incorporated into satellite, the resource manager 110 may be programmed to determine the future location of mobile node 105 according to the respective orbit paths of the satellites housing the mobile nodes 105. The resource manager 110 may be programmed to compare the orbit paths to determine when, if ever, the satellites will be in communication with one another and the time tick at which such communication between satellites may be possible. The resource manager 110 may be programmed to generate or update the routing table according to such information. In addition, or as an alternative to satellite-to-satellite communication, the resource manager 110 may consider the ground coverage of each satellite housing the mobile node 105 at each time tick. Thus, the resource manager 110 may determine which ground stations the satellite is able to communicate with based on the satellite's beam coverage and update or generate the routing table according to that information.

The resource manager 110 may be programmed to transmit the routing table for upload to the mobile nodes 105. The resource manager 110 may not be authorized to upload the routing table to one or more mobile nodes 105. In such instances, the resource manager 110 may transmit the routing table to a system gateway 120 that has authority to upload the routing table to one or more of the mobile nodes 105. The resource manager 110 may be programmed to transmit the routing table for upload prior to the next time tick.

In some possible implementations, the resource manager 110 may coordinate the foregoing routing functions with bandwidth and congestion management functions, which may also be performed by the resource manager 110. In doing so, the resource manager 110 may modify certain paths to, e.g., avoid overly congested paths for communication priorities that can tolerate additional latency given congestion and excess demand at certain time periods for certain paths.

Further, the resource manager 110 may generate the routing table to account for the locations of one or more ground-based nodes, each at a fixed location, in addition to the future locations of the mobile nodes 105. For instance, the resource manager 110 may determine the future locations of one mobile node, the future locations of a second mobile node, and the fixed locations of one or more ground-based nodes (such as terminals 115, gateways 120, etc.) and develop the routing table to generate routing paths that incorporate both moving nodes (e.g., the mobile nodes 105) and ground based nodes (e.g., the terminals 115, gateways 120, etc.). Thus, the routing table may be uploaded to both mobile nodes 105 and ground-based nodes 115, 120 as appropriate.

The resource manager 110 may be further programmed to incorporate alternative or conditional routing paths into the routing table. For instance, the resource manager 110 may associate particular routing paths to particular characteristics such as communication failures, congestion, or other routing limitations. The mobile node 105 may consider the presence of the predetermined characteristic and select the alternate routing path accordingly. For instance, if a routing table includes alternative characteristics based on congestion along a particular communication link, the mobile node 105 may consider how much congestion exists on that link before using it in the routing path. The amount of congestion may be determined in accordance with a congestion management process executed by the resource manager 110. For instance, the resource manager 110 may receive utilization and capacity information from mobile nodes 105 as well as demand data from terminals 115 and gateways 120. Certain congestion information may be determined by the mobile node 105 (e.g., local congestion) or communicated to the mobile nodes 105 from the resource manager 110 (either directly or through one of the gateways 120, such as a system gateway). If the congestion exceeds a predetermined threshold, as determined by the resource manager 110, the mobile node 105, or both, the mobile node 105 may select a different routing path (i.e., the alternative routing path) with or without any additional approval from the resource manager 110. A similar concept may apply to failures (whether learned of remotely or locally). Thus, the mobile nodes 105 may make autonomous, real-time decisions on alternate routing in the presence of locally learned or remotely communicated failures, congestion, or other routing limitations.

The terminals 115 are computer-based communication devices implemented via circuits, chips, antennas, or other electronic components that can communicate with mobile nodes 105 that are within communication range of the terminal 115. In some instances, the terminals 115 are stationary relative to a location on Earth. In other instances, the terminals 115 are mobile, meaning that the terminals 115 move relative to a location on the Earth. In some instances, the terminal 115 may provide an interface between a satellite and other ground-based communication devices. For instance, the terminal 115 may receive communications from a satellite and transmit such communications via terrestrial-based communication channels. Likewise, the terminals 115 may receive communications via a terrestrial-based communication channel and transmit the communication to a satellite. The terminal 115 may include a modulator and a demodulator to facilitate communications with mobile nodes 105, especially in the context of satellite communication. Moreover, each terminal 115 may have one or more antennas. Multiple antennas may allow a terminal 115 to communicate with multiple mobile nodes 105 at each time tick.

The gateways 120 are computer-based communication devices implemented via circuits, chips, antennas, or other electronic components that can communicate with the resource manager 110 and one or more mobile nodes 105. The gateways 120 may be programmed to communicate with one or more mobile nodes 105 within the communication range of the gateway 120. Each gateway 120 may be programmed to use different uplink and downlink methods to transmit data to and receive data from mobile nodes 105.

The term gateways 120 may refer to data gateways 120 and system gateways 120. Data gateways 120 may be used to facilitate multiple communication protocols along a network path. For instance, a data gateway 120 may be used to facilitate a transition from a satellite communication network to, e.g., a fiber optic network. Each system gateway 120 may be programmed to transmit control and configuration data to mobile nodes 105 as well as receive data, such as telemetry data, from the mobile nodes 105. The system gateways 120 may be configured to form a routing network for receiving packets on the downlink before uplinking the packets to a different node, including a different mobile node 105. Since system gateways 120 can communicate with multiple mobile nodes 105, the system gateway 120 may be able to receive packets via the downlink from one mobile node 105 and uplink the packets to a different mobile node 105 without having to store and forward the packets. And because system gateways 120 are programmed to transmit control and configuration data to mobile nodes 105, the system gateway 120 may be programmed to upload routing tables generated by the resource manager 110 to any number of mobile nodes 105 within the communication range of the system gateway 120. The system gateway 120 may further include instructions for propagating the routing table to other mobile nodes 105.

Figure 2:
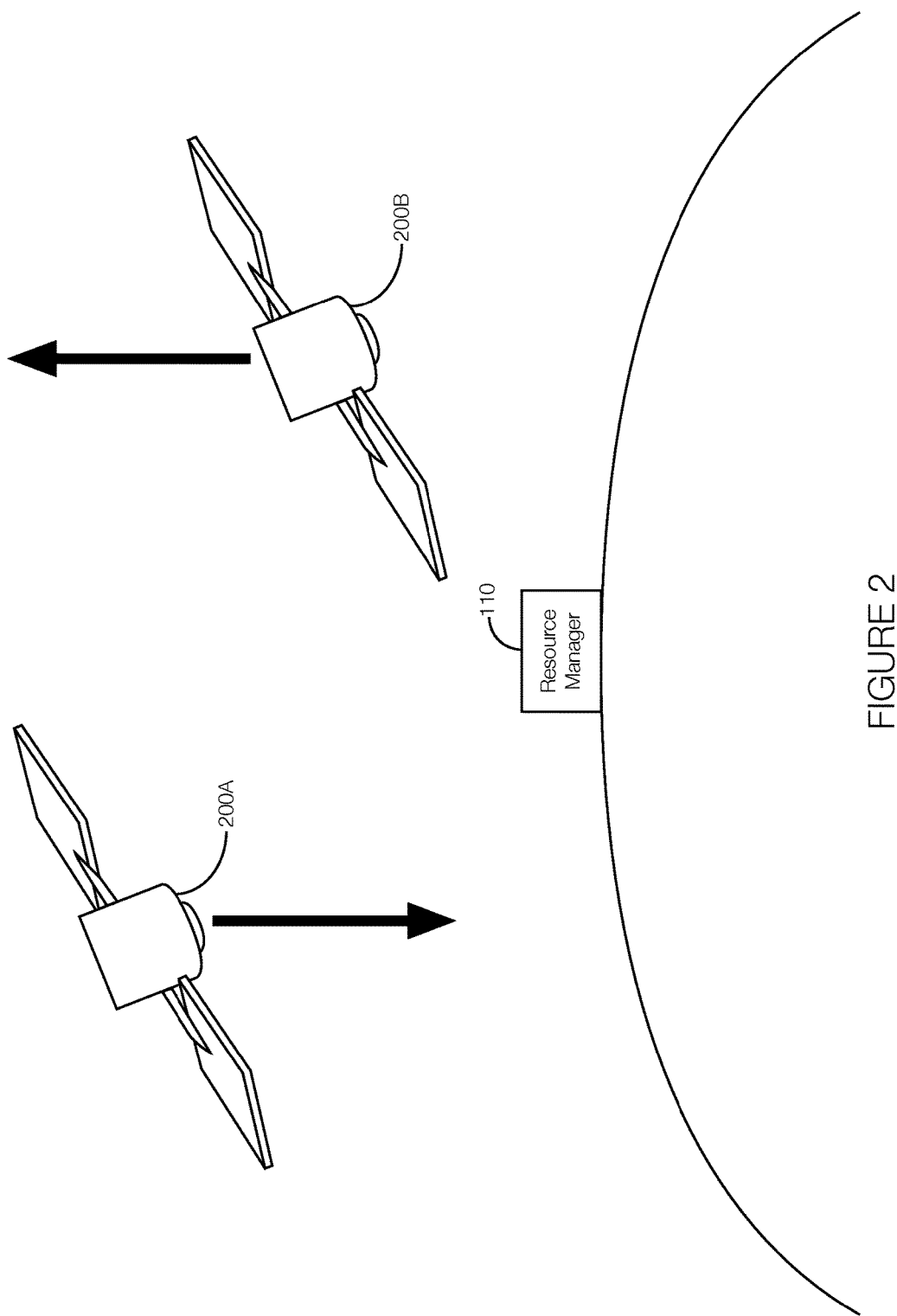
FIG. 2 illustrates orbiting satellites and a ground-based resource manager.

Referring now to FIG. 2, the mobile nodes 105 are incorporated into or implemented as satellites 200A and 200B (collectively, 200) in communication with a resource manager 110 located on the ground and in communication with one another at a particular time tick. The satellites 200 shown in FIG. 2 have different orbits. For instance, the satellites 200 are shown as moving in opposite directions although it is possible for the satellites 200 to move in the same directions and still have different orbits. For instance, one satellite 200A may be in a polar orbit while the other satellite 200B may be in an inclined orbit. Alternatively, both satellites may be in a polar orbit but different directions, a polar orbit with the same directions, the same inclined orbit, or a different inclined orbit. When the orbits of the satellites 200 are synchronized to one another, the satellites may always be in communication with one another but not always have the same beam coverage relative to ground stations. Further, in some instances, when the orbits of the satellites 200 are synchronized, there are instances where one satellite 200A may not be able to communicate with the same other satellites or ground stations as the other satellite 200B due to, e.g., variations in the communication strength of each satellite 200.

For each time tick, the resource manager 110 may be programmed to consider the locations of the satellites 200 and the communication range of the satellites 200 with regard to other satellites and ground stations (terminals 115, gateways 120, etc.). Because the time ticks are in the future, the resource manager 110 may predict the future locations of the satellites 200, the future communication ranges of the satellites 200, which satellites will be able to communicate with which other satellites at each time tick, etc. The resource manager 110 may develop a routing table representing one or more time ticks that indicates how each satellite 200 is to communicate. The resource manager 110 may transmit the routing table to a system gateway 120 with authorization to upload the routing table to one or more of the satellites 200. The satellites 200 may propagate the routing table to other satellites 200 not in the range of the resource manager 110, the system gateway 120, or both, so long as the resource manager 110 has considered the location of the satellite for the time tick associated with the routing table.

Communication over the telecommunications network may include transmitting and receiving packets. Each packet may include a destination address tag, which may or may not include an IP address. In various possible implementations, destinations may refer to one and only one ground destination, a particular satellite network mobile node 105 (including the mobile node 105 that received the packet), and a replication function that can then send multiple packets. For purposes of clarity and simplicity, the following examples focus on the packet being sent to one and only one ground destination.

The destination address tag may provide enough information to send the packet to a beam on the ground that contains the destination terminal 115 to which the packet is destined. Consider that the Earth may be divided into multiple beams, each of which has a distinct identifier. Factors such as the manner in which one or more satellites send on the downlink to a beam as they move, the size of the beams, whether the beams overlap, etc., may or may not be relevant to the packet destination. For instance, those factors may be less relevant in instances where the beam has a fixed definition at each time tick such that the routing tables to that beam get the packet to the final satellite network mobile node 105 that can downlink to that beam.

The destination address tag on which the satellite network mobile node 105 routes may be made up, at least in part, of an identifier that allows the destination receiver of the packet to know that it is the destination of the packet. The destination address tag could also contain a single beam address, a hierarchical beam address, or both. For a single beam address, each mobile node 105 may need to know which output path to use for each beam in the entire network regardless of where that satellite network mobile node 105 is relative to that beam. For a hierarchical beam address, the network node may only route on one part of the destination address depending on how far it is from that beam. An analogy would be a postal address. That is, one mobile node 105 may only route on a large area (e.g., a country), while a closer satellite may route on a smaller region (e.g., a state or city) within the large area, while yet another satellite, such as the satellite currently containing a downlink to that location on Earth, may route on an even more granular level (e.g., the street address). In this way, less is known about beams that are currently further away from that satellite network mobile node 105.

Note that it is possible that a different beam identifier may apply to a destination that is a terminal 115 versus a gateway 120 since the satellites may use a different mechanism to downlink packets to a terminal 115 versus a gateway 120 (e.g., via phased array versus mechanical pointing antenna). Those instances may be distinguished via the address such that the satellite will know how to downlink the packet. In addition, it is possible that a gateway 120 may be used as part of the path by which the packet traverses across the constellation. An example may include a packet that traverses a ground gateway 120 to cross between one orbital plane type and another. In that case, a packet may be directed via the downlink by the routing table even though the location on the ground is not yet the final destination beam. Further, these examples do not depend on the data included in the packet or whether the packet is of fixed or variable size.

FIGS. 3-6 illustrate various example routing tables that may be generated by the resource manager 110. For instance, in a system of mobile nodes 105 incorporated into satellites, each satellite mobile node 105 may have at least one uplink (e.g., a way to receive packets from the ground), 1 to N inter-satellite links (ISL) to other satellite mobile nodes 105, and one or more downlinks of one or more downlink types (i.e., a way to send packets to the ground). In such a system, the satellite network mobile node 105 can receive a packet via an input port (the uplink or one of the ISLs). Upon receipt of a packet not destined to itself, the satellite network mobile node 105 can route a packet to one of its own output ports (e.g., one of the downlinks or one of the ISLs). In addition, the communication options can include a ground network node at a gateway 120 that can also include a routing table and receive a packet on the downlink that it will route back to a different satellite on its uplink rather than out its terrestrial interface(s).

The examples discussed below focus on satellite network mobile nodes 105, but the same or a similar routing table concept could be used by a gateway 120. Further, while the source port on which the packet was received could be factored into the routing decision, for purposes of clarity and simplicity, the routing tables discussed below assume that the source port is not considered. Thus, the routing table may have the following characteristics: a destination tag, an output port, and a time to implement.

FIGS. 3 and 4 illustrate an example per beam routing table and an example hierarchical routing table, respectively, at one time tick and based on the position of the mobile nodes 105 in their orbits. Other routing tables representing future time ticks would represent the future locations of the mobile nodes 105 in their orbits. The other routing tables could be applied at the time associated with the future time tick. The routing table of FIG. 3 indicates which output port should be used for each beam. As shown in the simplified routing table of FIG. 3, the beams are numbered from 1 to 1000 and possible output ports include various ISLs (ISL A, ISL B, etc.) and various Downlink paths (Downlink X, Downlink Y, etc.).

The routing table of FIG. 4 is similar except that it relates various tags, beams, and output ports. The tags are discussed above, and represented in FIG. 4 as numbers. In the example of FIG. 4, the tags include 100, 200, 300, etc. Moreover, as discussed above, some tags may be associated with other, more granular tags. Hence, the "Tag 2" column. Each tag may be associated with a beam, an output port, or both.

FIG. 5 illustrates an example per beam routing table and alternate path information. That is, the routing table may have additional characteristics including an output port per priority and an alternate port if the primary port is congested or experiencing failure. Thus, the routing table of FIG. 5 identifies, for each beam, a priority, an output port, and an alternative output port. The priorities may be represented as high (H), medium (M), or low (L). In some instances, low priority packets are dropped if the output port is unavailable. For example, in the example shown in FIG. 5, a low priority packet on Beam 1 is dropped if ISL A has failed. Similarly, in the example shown in FIG. 5, a low priority packet on Beam 142 is dropped if Downlink Y has failed.

As mentioned above, similar concepts apply to the routing tables provided to the gateway 120. For instance, FIG. 6 illustrates an example routing table at the gateway 120. The routing table of FIG. 6 is similar to that of FIG. 3 except that it defines various Satellite Uplinks instead of ISL channels or Downlink channels.

In some instances, referred to as a dynamic system implementation, an existing routing protocol may be adapted to be used by the satellite constellation. Specifically, instead of determining reachability to IP subnets, these protocols may instead exchange hop reachability to destination addresses carried by packets.

In another instance, referred to as a static system implementation, satellites take static information, which is a function of time, and apply it with no dynamic computations of their own to change or modify the tables. Thus, the term "static" does not mean that the route tables cannot and will not be changed by the resource manager 110. With a static system implementation, code can be modified on ground equipment rather than on multiple satellites. Modifying code on ground equipment is less risky and generally easier than attempting to modify code on a satellite or other mobile node 105. Moreover, the ground system can receive hardware (higher computing power and memory) upgrades while already launched satellites cannot. Finally, any additional complexity on the satellite contributes to more weight, fuel usage, and cost.

Thus, in the static system implementation, the resource manager 110 may periodically, based on a set of inputs, calculate a set of tables to be used by each satellite network mobile node 105 for each time period into the future (e.g., at each time tick). The resource manager 110 may send those tables to a system gateway 120 so that they can be uploaded to the satellite mobile nodes 105 for future use. Since tables are being loaded for future time ticks, there is no issue with those tables only being partially applied unless an emergency real-time change in tables is applied.

When implementing a static system, the resource manager 110 may consider any one or more of the following inputs: the number of satellite network mobile nodes 105, which can change over time due to failures or growth of the constellation, but are relatively static; the ephemeris of the satellite constellation; the planned ISL connections to be made; the coverage of ground beams by satellite network nodes including any policies for which satellites light up which beams when regulatory or other issues that prevent landing or the addition of new beams in order to obtain more spectral density or based on population or regulatory factors; current known failures via telemetry; satellite network mobile node 105 issues; ISL connectivity issues; traffic priorities and the latency policy for each priority (a packet at high priority may take a more direct path than a packet at lower priority); and rules for traffic handling if primary path fails. That is, certain priorities may need to be dropped if the primary path through satellite fails due to, e.g., higher priority traffic that is unable to tolerate the additional delay variation. Further, dropping lower priority traffic may reduce congestion. The resource manager 110 may also take into account other factors such as connectivity allowed between network nodes (e.g., "at this time beam x does not send packets to beam y") and congestion information based on traffic admittance and bandwidth allocation policies.

The resource manager 110 may use, e.g., least cost path routing for each time tick to calculate a routing table for each network mobile node 105. The resource manager 110 may start calculating into the future and to calculate for N periods further into the future. For example, the resource manager 110 may calculate all tables for tomorrow from 3:00 UTC until 12:00 UTC. The resource manager 110 may also recalculate routing tables in response to a change in system state (e.g., failure of an ISL). The recalculated tables may be uploaded to mobile nodes 105, via, e.g., the system gateway 120, to replace current or near-future tables already sent to the network nodes. In some instances, the resource manager 110 may output one routing table per time tick per network mobile node 105. Again, the resource manager 110 may transmit the routing tables to upload to the mobile node 105 by, e.g., transmitting the routing tables to the system gateways 120 associated with the mobile node 105.

In the static system implementation, the satellite network mobile node 105 may receive and store satellite routing tables (one for each time tick) from the system gateways 120. Thus, those packets may be directly received at the mobile node 105 via the system gateways 120. Alternatively, the packets may be routed to mobile nodes 105 using previous routing tables over the ISLs. Note that a boot-strapped initial routing table may be used at startup to make it possible to use ISLs to distribute or route the tables.

The satellite network mobile nodes 105 may receive the static tables for new time ticks in the future, in which the routing tables may be stored without impacting any current routing processes. Another option is for the satellite network mobile nodes 105 to receive routing tables for future time ticks but with some overlap with time ticks for which the satellite network mobile node 105 already has a routing table. In that case, the new tables may overwrite the old tables in the local satellite memory for the same time tick. This approach may not impact any current routing processes. A third option is for the satellite network mobile node 105 to receive the static tables for the current time tick. In this case, the current routing table is replaced and any packets already queued to be sent on a downlink or out an ISL may not impacted. Newly arrived packets, however, may be subject to the new routing table.

Beyond the dynamic and static implementations, another possibility is a hybrid approach that uses the resource manager 110 described above with regard to the static system while relying on the satellite network mobile nodes 105 to exchange some information with neighboring satellite mobile network nodes via a protocol so that different satellite network mobile nodes 105 can handle their respective tables differently. For instance, if the ground provided an alternate path(s) in the static routing table, the information received could be used to get a satellite node to determine that it should use an alternate instead of primary path. This hybrid system may address real-time failures or delays in ISL connectivity, respond to quickly changing congestion or temporary congestion, address issues with downlinking to certain beams including interference, etc. The hybrid system handles this by adding a real-time protocol aspect to the satellite network mobile nodes 105, but not nearly as much complexity as running a routing protocol. Under other implementations, the resource manager 110, for example, may not be able to address the foregoing issues.

Figure 7:
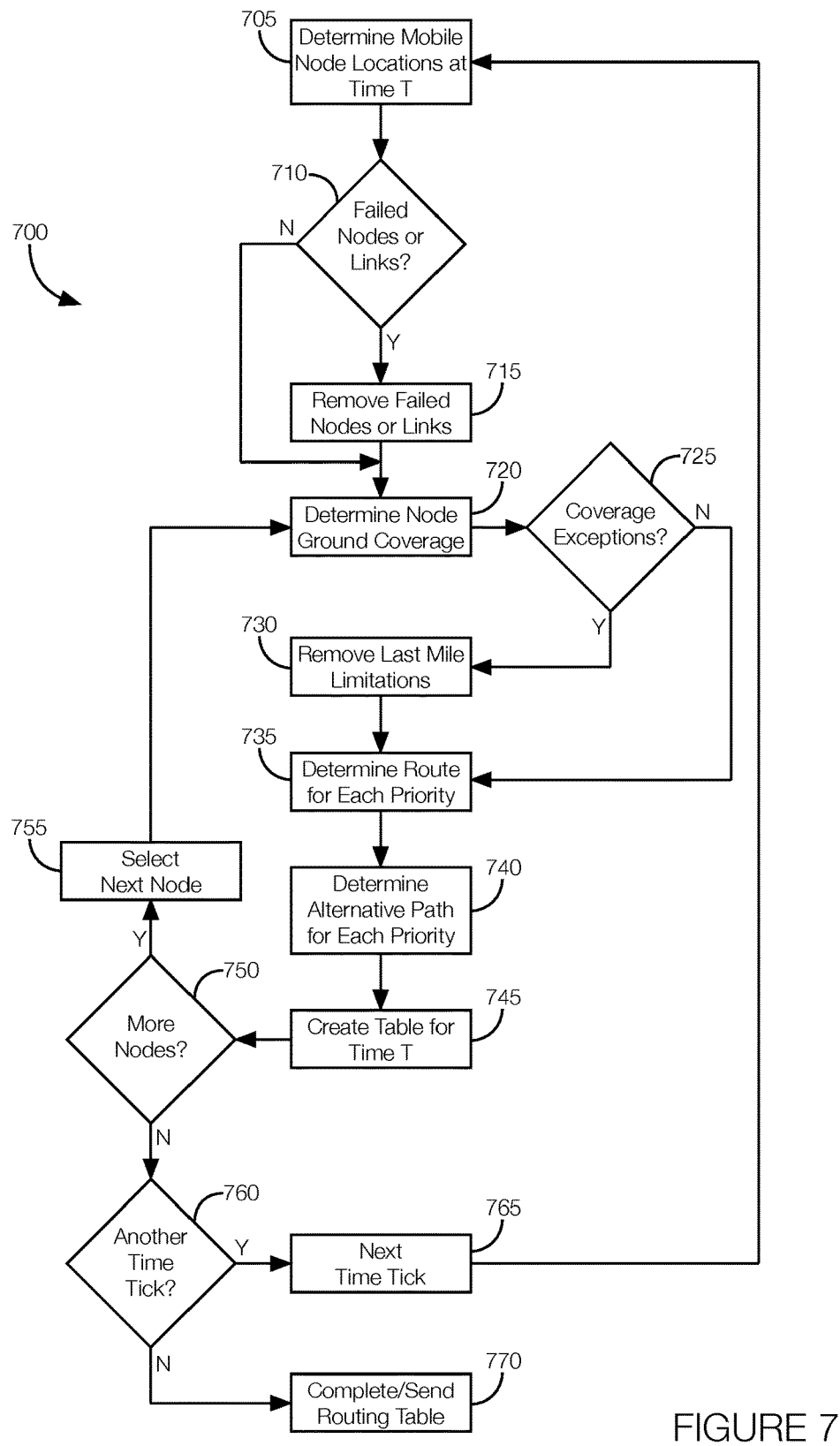
FIG. 7 is a flowchart of an example process that may be executed by the resource manager for coordinating routing among mobile network nodes.

FIG. 7 is a flowchart of an example process 700 that may be executed by the resource manager 110 for coordinating routing among mobile network nodes. The process 700 may be executed periodically depending on the communication ranges of the mobile nodes 105, how often "neighboring" mobile nodes 105 change, how often mobile nodes 105 are in communication range of a system gateway 120, etc. The process 700 may repeat periodically, such as on the order of every minute, every 5 minutes, every 10 minutes, etc. Thus, the process 700 may be used by the resource manager 110 to develop several routing tables, each representing a particular time tick, or a single routing table that indicates how communications are to be routed at particular time ticks. Moreover, each routing table generated in accordance with the process 700 considers the locations of multiple mobile nodes 105 at each time tick.

At block 705, the resource manager 110 determines the location of a mobile node 105 at one time tick, T, which may be a future time tick (relative to when the process 700 is executed). The resource manager 110 may determine the location of the mobile node 105 based on data received from the mobile node 105, from a system gateway 120, or the like. In one possible approach, the resource manager 110 may determine or predict the location of the mobile node 105 at the time tick according to an orbit path of the mobile node 105 (when the mobile node 105 is incorporated into a satellite) since the orbit path is not likely to change very often. When it does change, however, the resource manager 110 may receive a communication representing the change to the orbit path so that the new orbit path may be considered when generating future routing tables.

At decision block 710, the resource manager 110 determines if any mobile nodes 105 or communication links in the telecommunication system 100 have failed. Moreover, the resource manager 110 may determine if any mobile nodes 105 have changed their orbit paths. If any mobile nodes 105 or links have failed, or if the orbit paths for any mobile nodes 105 have changed, the process 700 may proceed to block 715. Otherwise, the process 700 may proceed to block 720.

At block 715, the resource manager 110 updates a local or remote (relative to the resource manager 110) database of available mobile nodes 105 and communication links. For instance, the resource manager 110 may remove failed mobile nodes 105 and communication links from the database or otherwise indicate that the failed mobile node 105 and communication links are no longer available to route communications. Further, the resource manager 110 may update the database to reflect changes in the orbit paths of one or more of the mobile nodes 105.

At block 720, the resource manager 110 determines the ground coverage of one of the mobile nodes 105. In the context of satellites, the ground coverage may refer to the area on the Earth serviced by the satellite. In other words, the "beam coverage" may be the satellite's "footprint" relative to the Earth. Thus, by determining the ground coverage, the resource manager 110 may determine which ground-based communication devices are in communication range of the mobile node 105.

At decision block 725, the resource manager 110 determines if any coverage exceptions apply to the mobile node 105 at the time tick. A coverage exception may refer to something that would prevent the mobile node 105 from communicating with one or more ground-based communication devices within its ground coverage, something that would prevent the mobile node 105 from communicating with one or more neighboring mobile nodes 105, or the like. Moreover, in some instances, the coverage exceptions may refer to "last mile limitations," discussed in greater detail below. If any coverage exceptions apply, the process 700 proceeds to block 730. If no coverage exceptions apply, the process 700 proceeds to block 735.

At block 730, the resource manager 110 removes any last mile limitations associated with the mobile node 105. Last mile limitations refer to the way the mobile node 105 communicates with an end user. The resource manager 110 may remove last mile limitations since last mile limitations do not affect how the mobile node 105 routes communications to other mobile nodes 105.

At block 735, the resource manager 110 determines the route (i.e., the output port) for each packet priority to be used by the mobile node 105. For instance, the resource manager 110 may determine how the mobile node 105 should route high, medium, and low priority packets. That is, the resource manager 110 may identify which downlink, ISL, etc., to use for each packet priority.

At block 740, the resource manager 110 determines the alternate route for each priority. For instance, the resource manager 110 may determine a different downlink, ISL, etc., if the route determined at block 735 is unavailable or otherwise unsuitable for transmitting the packet. In some instances, the resource manager 110 may determine that certain packets (such as low priority packets) should be dropped if the primary route is unavailable.

At block 745, the resource manager 110 creates or updates a table for the time tick. The table includes the primary and alternative routes determined at blocks 735 and 740, respectively, for the mobile node 105 under evaluation.

At decision block 750, the resource manager 110 determines if more mobile nodes 105 should be considered. If so, the process 700 proceeds to block 755. Otherwise, the process 700 proceeds to block 760.

At block 755, the resource manager 110 selects the next mobile node 105, and the process 700 proceeds to block 720 so that the resource manager 110 may determine the ground coverage for that mobile node 105 (block 720), determine whether there are any coverage exceptions for that mobile node 105 (block 725), remote last mile limitations (block 730), determine the route for each priority for that mobile node 105 (block 735), determine an alternative path for each priority for that mobile node 105 (block 740), and add the mobile node 105 to the table for that time tick (block 745).

At decision block 760, the resource manager 110 determines whether it needs to evaluate another time tick. If so, the process 700 proceeds to block 765. If not, the process 700 proceeds to block 770.

At block 765, the resource manager 110 increments the time tick, and the process 700 proceeds to block 705 so that the location of the mobile node 105, at the subsequent time tick, can be evaluated and added to the routing table.

At block 770, the resource manager 110 completes and transmits the routing table. The routing table may be transmitted by the resource manager 110 for upload to one or more mobile nodes 105. In some instances, the resource manager 110 transmits the routing table directly to one or more mobile nodes 105. In an alternative approach, such as when the resource manager 110 lacks permission to transmit configuration data to a mobile node 105, the resource manager 110 may transmit the routing table to a system gateway 120 with authorization to upload the routing table to one or more of the mobile nodes 105.

Figure 8:
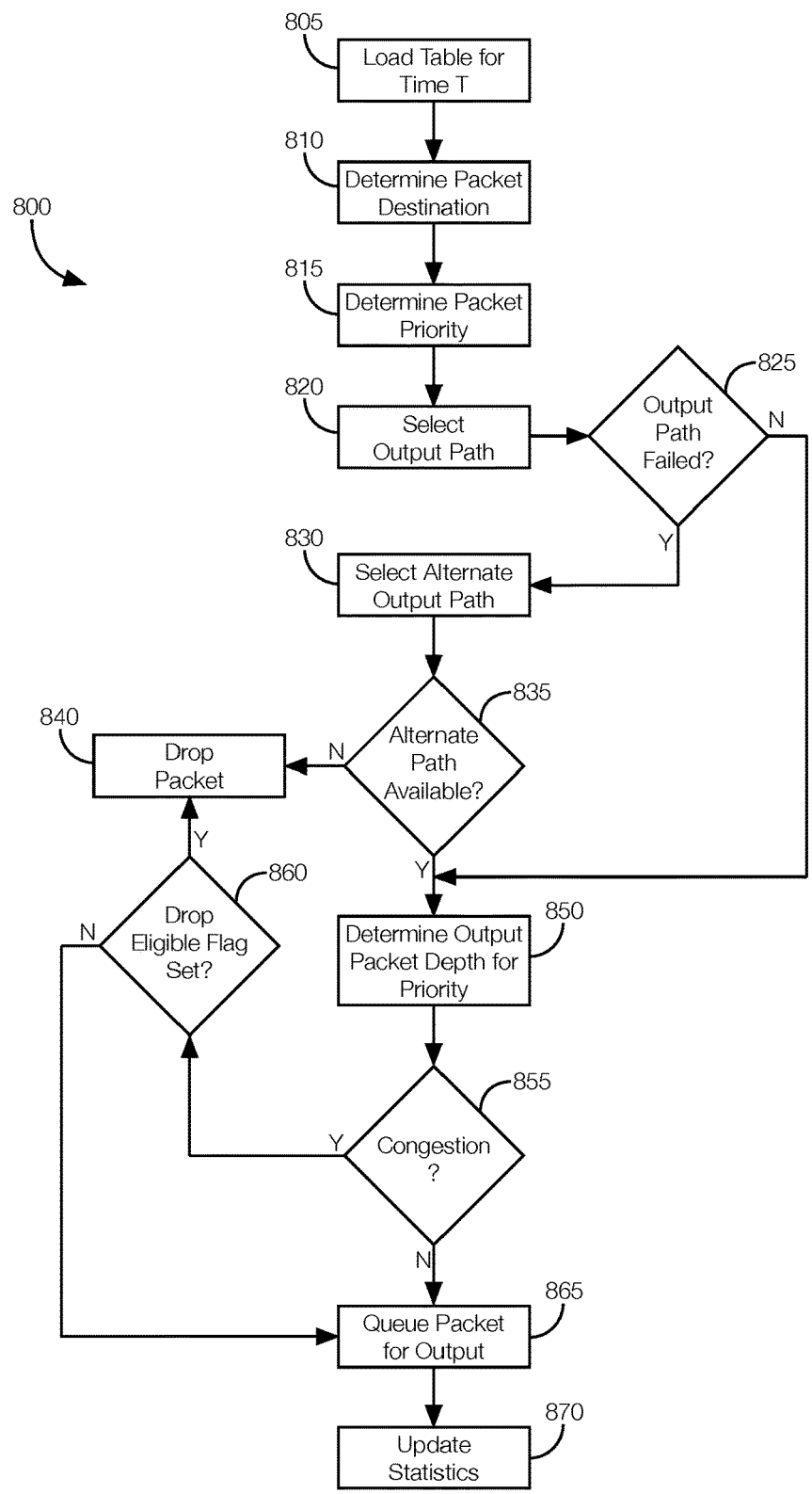
FIG. 8 is a flowchart of an example process that may be executed by the mobile network nodes for routing communications.

FIG. 8 is a flowchart of an example process 800 that may be executed by the mobile nodes 105 for routing communications. The process 800 may be executed any time during operation of the mobile node 105, such as when the mobile node 105 receives a packet to forward to other mobile nodes 105, ground-based communication devices, etc.

At block 805, the mobile node 105 loads the routing table associated with the present time tick. The routing table may be received from the resource manager 110, a system gateway 120, another mobile node 105, or the like. The routing table may indicate the primary route, alternate route, etc., for each packet. In some instances, the routing table may further indicate the primary route, alternate route, or both, based on packet priority.

At block 810, the mobile node 105 determines the packet destination. The packet destination may be determined from data contained in, e.g., the packet header. The process 800 may proceed to block 815 after the mobile node 105 determines the packet destination.

At block 815, the mobile node 105 determines the packet priority. Like the destination, the packet priority may be identified in the packet header. The process 800 may proceed to block 820 after the priority of the packet is determined. In some instances, the mobile node 105 may further consider the time-to-live (TTL) (hop count) or other characteristic representing the age of the packet to determine if, e.g., the packet is too old deliver. In such instances, the process 800 may proceed to block 840 so that the packet may be dropped.

At block 820, the mobile node 105 selects the output path. The output path may be the primary route (i.e., the primary output port) identified in the routing table. The mobile node 105 may select the output port based on the packet destination and priority determined from blocks 810 and 815, respectively, in accordance with the routing table for the time tick.

At decision block 825, the mobile node 105 determines if the output path used at block 820 failed. For instance, the mobile node 105 may determine that the output path used to transmit the packet at block 820 has failed if, e.g., that communication link has failed, the neighboring mobile node 105 or ground-based communication device failed to receive the packet, or the like. If the output path has failed, the process 800 may proceed to block 830. Otherwise, the process 800 may proceed to block 850.

At block 830, the mobile node 105 selects an alternate path. The alternate path may be the alternate route (i.e., the alternate output port) identified in the routing table. The mobile node 105 may select the alternate path based on the packet destination and priority determined from blocks 810 and 815, respectively, in accordance with the routing table for the time tick.

At decision block 835, the mobile node 105 determines if the alternate path is available. For instance, the mobile node 105 may determine whether the alternate path is available based on, e.g., whether the alternate path exists, is working properly, is being used to transmit other packets, has capacity to transmit the packet, etc. If the alternate path is available, the process 800 proceeds to block 850. If the alternate path is not available, the process 800 proceeds to block 840.

At block 840, the mobile node 105 drops the packet. Dropping the packet may include the mobile node 105 simply deleting it from (or never adding it to) the transmit queue. In some instances, dropping the packet may include the mobile node 105 proceeding as if the packet was never received. The mobile node 105 may, in some possible approaches, transmit a signal back to the mobile node 105 or ground-based communication device that transmitted the packet to the mobile node 105 that indicates that the packet cannot be forwarded and will be dropped.

At block 850, the mobile node 105 determines the output packet depth based on the priority of the packet. The packet depth may refer to the number of packets that can be queued at a particular time. The packet depth may further be a function of priority. That is, a different packet depth may apply to packets with different priorities. The process 800 may proceed to block 855 once the packet depth, based on the priority of the packet, is determined.

At decision block 855, the mobile node 105 determines where there is too much congestion on the route path to transmit the packet. If so, the process 800 may proceed to decision block 860 so the mobile node 105 may determine whether it can drop the packet. If there is no congestion or if the level of congestion is not too high, the process 800 proceeds to block 865.

At decision block 860, the mobile node 105 determines whether it can drop the packet. For instance, the mobile node 105 determines if it is authorized to drop certain packets based on, e.g., whether a drop eligible flag is set. If the flag is set, meaning the packet can be dropped, or the mobile node 105 otherwise determines that it can drop the packet, the process 800 proceeds to block 840. If the flag is not set, meaning the packet cannot be dropped, or the mobile node 105 otherwise determines that it cannot drop the packet, the process 800 proceeds to block 865.

At block 865, the mobile node 105 queues the packet for transmission. The mobile device may queue the packet for output according to the primary path or the alternate path defined by the routing table for the time tick and in accordance with the decisions made at blocks 820, 825, 830, 835, etc. Moreover, the mobile node 105 may queue the packet according to the telecommunications protocols implemented by the mobile node 105.

At block 870, the mobile node 105 may update statistics associated with its queuing of the packet, transmission of the packet, or both. The process 800 may return to block 805 after the next packet is received.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device with programmable circuits, chips, or other electronic components.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A resource manager computer for a telecommunication system, the resource manager computer comprising:
 a memory; and
 a processor programmed to execute instructions stored in the memory, wherein, as a result of executing the instructions, the processor:
  determines a future location of a first mobile node, wherein the future location of the first mobile node is a location of the first mobile node at a future time,
  determines a future location of a second mobile node, wherein the future location of the second mobile node is a location where the second mobile node will be in communication with the first mobile node at the future time,
  associates the future location of the first mobile node and the future location of the second mobile node to the future time,
  determines a routing path that includes communication between the first mobile node and the second mobile node at the future time,
  updates a routing table with the routing path, and
  transmits the routing table for upload to the first mobile node and the second mobile node.

2. The resource manager computer of claim 1, wherein the processor is programmed to transmit the routing table for upload to the first mobile node and the second mobile node prior to the future time.

3. The resource manager computer of claim 1, wherein the first and second mobile nodes are incorporated into satellites and wherein the processor is programmed to determine the future locations of the first and second mobile nodes based on an orbit path associated with each of the first and second mobile nodes.

4. The resource manager computer of claim 1, wherein the processor is programmed to determine a ground coverage associated with each of the first and second mobile nodes at the future locations of the first and second mobile nodes and generate the routing table based at least in part on the future locations and ground coverage of each of the first and second mobile nodes.

5. The resource manager computer of claim 1, wherein the processor is programmed to determine a plurality of future locations of the first mobile node and a plurality of future locations of the second mobile node, associate each future location with a future time, and generate the routing table based at least in part on the plurality of future locations of the first mobile node, the plurality of future locations of the second mobile node, and the future time that the first and second mobile nodes will be at each of the future locations.

6. The resource manager computer of claim 1, wherein the processor is programmed to transmit the routing table to a system gateway programmed to upload the routing table to the first and second mobile nodes.

7. A method comprising:
 determining, via a resource manager of a telecommunication system, a future location of a first mobile node, wherein the future location of the first mobile node is a location of the first mobile node at a future time;
 determining a future location of a second mobile node, wherein the future location of the second mobile node is a location where the second mobile node will be in communication with the first mobile node at the future time;
 associating the future location of the first mobile node and the future location of the second mobile node to the future time;
 determining a routing path that includes communication between the first mobile node and the second mobile node at the future time;
 updating a routing table with the routing path; and
 transmitting the routing table for upload to the first mobile node and the second mobile node.

8. The method of claim 7, wherein transmitting the routing table for upload to the first mobile node and the second mobile node includes transmitting the routing table prior to the future time.

9. The method of claim 7, wherein determining the future locations of the first and second mobile nodes is based at least in part on an orbit path associated with each of the first and second mobile nodes.

10. The method of claim 7, further comprising:
 determining a ground coverage associated with each of the first and second mobile nodes at the future locations of the first and second mobile nodes; and generating the routing table based at least in part on the future locations and ground coverage of each of the first and second mobile nodes.

11. The method of claim 7, wherein determining the future locations of the first mobile node and the second mobile node include determining a plurality of future locations of the first mobile node and a plurality of future locations of the second mobile node, and the method further comprising:
associating each future location with a future time; and
generating the routing table based at least in part on the plurality of future locations of the first mobile node, the plurality of future locations of the second mobile node, and the future time that the first and second mobile nodes will be at each of the future locations.

12. The method of claim 7, wherein transmitting the routing table includes transmitting the routing table to a system gateway programmed to upload the routing table to the first and second mobile nodes.

13. A telecommunication system comprising:
a first satellite following a first orbit;
a second satellite following a second orbit different from the first orbit;
a system gateway in periodic communication with the first satellite and the second satellite; and
a resource manager programmed to determine a future location of a first satellite, determine a future location of a second satellite, wherein the future location of the first satellite is a location of the first satellite at a future time and wherein the future location of the second satellite is a location where the second satellite will be in communication with the first satellite at the future time,
wherein the resource manager is further programmed to associate the future location of the first satellite and the future location of the second satellite to the future time, determine a routing path that includes communication between the first satellite and the second satellite at the future time, update a routing table with the routing path, and transmit the routing table to the system gateway,
wherein the system gateway is programmed to upload the routing table to the first satellite and to the second satellite, and
wherein the first satellite and second satellite are programmed to communicate in accordance with the routing path at the future time.

14. The telecommunication system of claim 13, wherein the resource manager is programmed to transmit the routing table to the system gateway prior to the future time, wherein the system gateway is programmed to upload the routing table to the first satellite and the second satellite prior to the future time.

15. The telecommunication system of claim 13, wherein the resource manager is programmed to determine a ground coverage associated with each of the first and second satellites at the future locations of the first and second satellites and generate the routing table based at least in part on the future locations and ground coverage of each of the first and second satellites.

16. The telecommunication system of claim 13, wherein the resource manager is programmed to determine a plurality of future locations of the first satellite and a plurality of future locations of the second satellite, associate each future location with a future time, and generate the routing table based at least in part on the plurality of future locations of the first satellite, the plurality of future locations of the second satellite, and the future time that the first and second satellites will be at each of the future locations.

17. The telecommunications system of claim 13, further comprising a ground-based node at a fixed location, wherein the resource manager is programmed to generate the routing table according to the future location of the first satellite, the future location of the second satellite, and the fixed location of the ground-based node.

18. The telecommunications system of claim 13, wherein the resource manager is programmed to incorporate at least one alternative routing path into the routing table, associate each alternative routing path to a predetermined characteristic, and wherein at least one of the first satellite and the second satellite is programmed to select the alternative routing path in accordance with the predetermined characteristic.

* * * * *